INVENTOR
Hellmuth Schöneborn
By McGlew and Toren
ATTORNEYS

United States Patent Office 3,495,246
Patented Feb. 10, 1970

3,495,246
ANTENNA ENERGIZING ARRANGEMENT FOR DIRECTION FINDING UTILIZING AMPLITUDE COMPARISON
Hellmuth Schöneborn, Assling, Germany, assignor to Bolkow Gesellschaft mit beschrankter Haftung, Ottobrunn, near Munich, Germany
Filed Dec. 5, 1967, Ser. No. 688,116
Claims priority, application Germany, Dec. 17, 1966, B 90,361
Int. Cl. G01s 9/02
U.S. Cl. 343—16          11 Claims

ABSTRACT OF THE DISCLOSURE

An antenna energizing arrangement for direction finding uses amplitude comparison using superposed and/or juxtaposed elements for transmitting and/or receiving, in which the elements are interconnected through a hybrid junction forming the sum and difference of the radiating characteristics of two mutually associated elements. The hybrid junction interconnects these mutually associated elements with one another in such a manner that two directional characteristics, deflected in opposite directions relative to the symmetry axis of the antenna and overlapping each other, are present simultaneously. The hybrid junction incorporates a phase shifting construction operable to produce a phase shift of preferably 90° between the mutually associated elements, so that, in each conduction branch, one associated with each element, the respective phase shifted signal is available simultaneously with the phase shifted signal in a respective conduction branch of the other element.

BACKGROUND OF THE INVENTION

In order to determine the direction of a radiating or reflecting body or object, it is known to use antennas having two overlapping directional characteristics which are switched on alternately. Two corresponding signal voltages can thus be tapped from the output of the receiver connected at the output side of the respective antenna, these two voltages being switchable in the same rhythm. The amplitude difference of the two tapped signal voltages represents information on the direction of the deviation of the object from the directional axis of the antenna. This method is known as the "amplitude comparison method," and is generally referred to as "Lobeswitching" or as "Sequential Lobing," and is described, for example, in "Introduction to Radar Systems," by Skolnik, 1962, pp. 165 and 166, published by McGraw-Hill Book Company of New York.

The changing over of the directional characteristics for transmitting or receiving purposes is effected, for example, in the X-band where tubular conductors must be used, and is effected by switchable phase shifters with microwave ferrites. In this connection, attention is directed to Reggia and Spencer, "Proceedings of the IRE," of November 1957, pp. 151 et seq. Such an arrangement is shown, for example, in FIG. 1 of the accompanying drawings, wherein a so-called 3 db-coupler is illustrated at K, and uniformly distributes the output of a transmitter (not shown) over the arms $a$ and $b$ feeding the parabolic mirror P. A respective microwave ferrite F is disposed in each arm, and these ferrites can be longitudinally magnetized, in alternation with each other, by the associated coils or windings I and II to effect a corresponding phase shift with the associated deviations of the characteristic. Namely, there is produced, on excitation of winding I, the characteristic $Ia$ shown in FIG. 2 and, on excitation of the winding II, the characteristic $IIb$ also shown in FIG. 2. During receiving, the same conditions hold true reciprocally.

In order to produce the required field intensities in the ferrites, a certain number of ampere turns is required in windings I and II. When the currents are small and the number of turns high, the magnetizing current increases only slowly, and a jerky switching of the characteristics is not possible. This holds true not only for connection or energization of the coils, but also for disconnection or de-energization thereof. When, on the other hand, the number of turns is small and the current is large, as of the order of magnitude of about 10A, a very expensive and complicated switching mechanism is required. In addition, when using transistors as switching means with these currents, there result undesirable connection time lags of the order of about 10 to 12 microseconds. Finally, such a feeding of the antenna system is complicated and necessitates a large expenditure, since the windings I and II lie directly in the radiation field of the parabolic mirror P.

In order to determine the deviation of an object from the directional axis of an antenna having overlapping directional characteristics, it is also known to derive the sum and the difference of the directional characteristics simultaneously. An error signal, representing information on the direction of the deviation from the directional axis of the antenna can be obtained from a phase-sensitive detector which is connected to the outputs of the amplifiers associated with the antenna. This locating method, known as the "monopulse method," can be inferred, for example, from the above-mentioned publication by Skolnik, pp. 175–177.

For the purpose of simultaneously deriving the sum and the difference of the overlapping directional characteristics, so-called hybrid junctions are used, such as Magic T's, for example, and these are arranged between the transmitter and/or the receiver and the radiating elements. However, the directional characteristic of a signal radiating element can no longer be derived. The energization of the antennas, in this procedure, is effected through feeding of the transmitting and receiving energy to both sides of the focal point, and thus outside of the latter.

As compared with the amplitude comparison method, the monopulse method has the advantage that so-called amplitude noise of the object to be located cannot occur. However, and despite the saving in additional switching means for the formation of the sum and the difference of the directional characteristics, this advantage is obtained only with a higher expenditure on the receiving side. At least two complete receivers must be present for direction finding in one plane, and higher demands are made on the phase stability of the two separate receivers. In this connection, see the bottom of p. 195 of the aforementioned publication by Skolnik.

For certain applications where, in the final analysis, it is not a matter of extreme accuracy of the direction finding but rather a matter of low weight, small volume and high reliability, such an expenditure is not justifiable. Thus, for example, for radar homing heads for missiles which are to be used for larger targets, such as vessels, for example, the use of the monopulse method is prohibitive.

SUMMARY OF THE INVENTION

This invention relates to direction finding using amplitude comparison and, more particularly, to an improved, simplified, and less expensive antenna energizing arrangement for direction finding by the amplitude comparison technique.

In accordance with the invention, an antenna energizing arrangement is provided which, as compared with known arrangements, is advantageously different, operates without switching means controlled over inductive elements, such a ferrite phase shifters or the like, and provides for a simple and correct switching of the overlapping antenna characteristics. The antenna energizing arrangement of the present invention is particularly suitable for use in homing heads for missiles, and thus is designed to have a light weight, to require a minimum of space and to operate reliably.

Using as a basis an arrangement for energizing of antennas for direction finding by amplitude comparison, and including several elements which are juxtaposed and/or superposed with each other for transmitting and/or receiving, in accordance with the present invention, the elements are connected with each other through a hybrid junction forming the sum and difference of the radiation characteristics of two mutually associated elements and in such a manner that two directional characteristics, each deflected in a respective opposite direction from the symmetry axis of the antenna and overlapping, are simultaneously present.

In order to determine the deviation of the respective directional characteristics from the symmetry axis, a phase shifter is used to produce a phase shift of preferably 90° between two facing elements serving for transmitting and receiving. The arrangement is such that, at one output of the hybrid junction, the phase shift in the conduction branch of one element and, in the other output of the hybrid junction, the phase shift in the conduction branch of the other element, are provided simultaneously with each other. Thereby a simultaneous deflection of the characteristics from the symmetry axis of the antenna is attained, while preserving the directional characteristic of each individual radiating element.

The hybrid junction can comprise, for example, a magic T, a hybrid ring sometimes called rat race acting as a differential transformer, or a decoupled branching from two parallel rectangular hollow conductors coupled at narrow sides through a slot, comprising a so-called "side wall short slot coupler," without, however, limiting the scope of the invention thereto.

In accordance with a further feature of the invention, the phase shifter is variable in both directions from $\phi=90°$ about $\pm\Delta\phi$ and in such a manner that a deviation of the symmetry axis of the overlapping directional characteristics takes place. Since, by this provision, the symmetry axis of the antenna can be turned by a corresponding angular amount to the right or to the left, an adjusting of the antenna relative to a given axis is possible.

In order to avoid the necessity of switching high frequencies of the X-band, or of a similar high frequency band, the two outputs of the hybrid junction are, in accordance with a further feature of the invention, each connected with a respective individual mixer stage, each of which mixer stages converts the respective received frequencies to a lower intermediate frequency. The outputs of the mixer stages are connectable in alternation with an amplifier through a switch means, and the output of the amplifier, through a further switch means operating in the same rhythm with the just-mentioned switch means, is switchable alternately between two inputs of an evaluation device. The switch means may comprise electronic switches having rectangular switching characteristics, and preferably so-called "switching diodes," which are known per se, are used as the switch means. By virtue of the high switching frequency between the two simultaneously present directional characteristics, the amplitude noise, hitherto present in arrangements for amplitude comparison direction finding, is reduced to a minimum.

A further feature of the invention is that, with the antenna energizing arrangement of the invention as used in a radar installation, switching between the individual directional characteristics of the antenna takes place only on the receiving side of the installation. In order to feed the transmitting energy into the antenna system, a separate channel is therefore provided. This has the advantage that the transmitting characteristic is not switched along with the receiving characteristic. As a result, an opponent has no possibility of recognizing the switch-over frequency, and interference by simulation of false targets is therefore impossible. Moreover, an effective decoupling of the receiving and transmitting channels is obtained, so that measures for the protection of receiver mixing diodes, or so-called TR switches, can be simplified. This again further decreases the total cost of the installation.

Accordingly, an object of the present invention is to provide an improved and simplified antenna energizing arrangement for use in direction finding installations employing the amplitude comparison technique.

Another object of the invention is to provide such an antenna energizing arrangement which is operable without switch means controlled by devices having inductance.

A further object of the invention is to provide such an antenna energizing arrangement capable of obtaining a simple and correct switching-over of overlapping antenna characteristics.

Yet another object of the invention is to provide such an antenna energizing arrangement which is particularly suitable for use in homing heads for missiles, and which is designed to have light weight, to require only a small space and to operate reliably.

A further object of the invention is to provide such an antenna energizing arrangement in which two mutually associated elements, arranged in superposition and/or juxtaposition, are connected with each other through a hybrid junction forming the sum and difference of their radiation characteristics, and in such a manner that the two directional characteristics, each deflected in a respective opposite direction relative to the symmetry axis of the antenna and overlapping, are present simultaneously.

Still another object of the invention is to provide such an antenna energizing arrangement including phase shifting means for producing a phase shift of preferably 90° between the two facing elements so that, for one output of the hybrid junction, the phase shifted signal in the conduction branch of one element and, for the other output of the hybrid junction, the phase shifted signal in the conduction branch of the other element, are simultaneously derived.

A further object of the invention is to provide such an antenna energizing arrangement in which simultaneous deflection of the characteristics from the symmetry axis of the antenna is attained while preserving the directional characteristics of the individual radiating elements.

Another object of the invention is to provide such an antenna energizing arrangement in which the phase shift is variable in either direction from $\phi=90°$ through approximately $\pm\Delta\phi$.

A further object of the invention is to provide such an antenna energizing arrangement in which the symmetry axis of the antenna can be turned through corresponding angles to the right or to the left so that adjusting of the antenna relative to a given axis is possible.

Still another object of the invention is to provide such an antenna energizing arrangement in which switching between the individual directional characteristics, in a radar installation, takes place only on the receiving side.

A further object of the invention is to provide, in a radar installation, such an antenna energizing arrangement in which the transmitting energy is fed into the antenna system through a separate channel.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

In the following description, for the sake of simplicity, an arrangement for direction finding in only one plane, such as in the horizontal plane, for example, i.e. in the azimuth, is described. For space direction finding, a second identical arrangement arranged in the plane at right angles to the azimuth would be used additionally.

Figure 1:
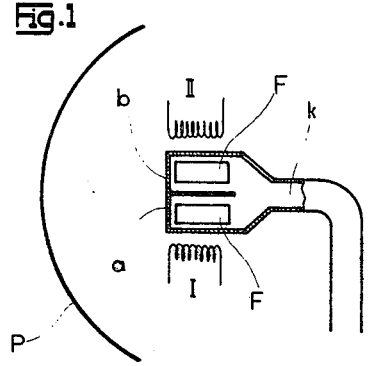
FIG. 1 is a schematic illustration of the previously mentioned prior art antenna energizing arrangement.
Figure 2:
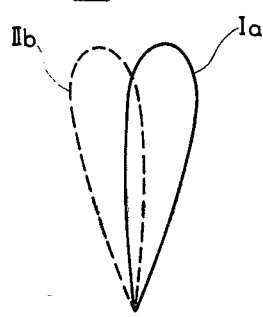
FIG. 2 is a schematic illustration of the antenna characteristics with the arrangement shown in FIG. 1.
Figure 3:
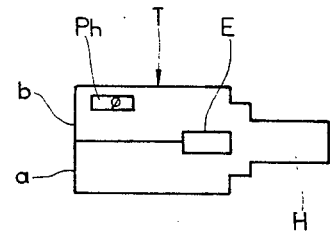
FIG. 3 is a schematic illustration of an antenna energizing arrangement embodying the invention.

Referring to FIG. 3, in a so-called magic T for energizing an antenna system, not shown in FIG. 3 but illustrated at P in FIG. 1 and analogously to the already described arrangement shown in FIG. 1, $a$ and $b$ denote the two radiating or receiving hollow conductors. The E-arm of the magic T is denoted at E, and the H-arm of the magic T is denoted at H. A solid phase shifter in one of the two parallel hollow conductors is indicated at Ph, and in FIG. 3 is shown as provided in hollow conductor $b$. Phase shifter Ph produces a phase shift of preferably $\phi=90°$.

Figure 4:
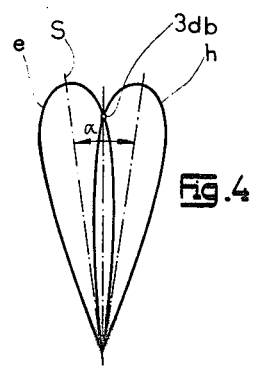
FIG. 4 schematically illustrates the antenna characteristics corresponding to the antenna energizing arrangement of FIG. 3.

During receiving, and upon the occurrence of an electromagnetic wave at $a$ and $b$, there is produced in arm H, which forms the sum of the occurring wave portions $a$ and $b$, a wave $a+b+\phi$. On the other hand, in the arm E, there is formed a wave $a+b+\phi-180°$, since the arm E forms the difference between the occurring wave portions. If, as already mentioned, $\phi$ is selected to be equal to 90°, then there results in arm H a wave $a+b+90°$, and there results in arm E $a+b-90°$. For the antenna system, this means that the directional characteristic is deflected each time by half the aperture angle, or $\alpha/2$, in the 3 db point and relative to the symmetry axis S shown in FIG. 4. In the right-direction diagram, $e=+90°$ and, in the left-direction diagram, $h=-90°$. Both direction characteristics $e$ and $h$ are thus, in contrast to the antenna excitation arrangement shown in FIG. 1, present simultaneously.

In order to be able to deflect a symmetry axis of the overlapping directional characteristics, the arrangement is developed in such a way that the phase shift $\phi$ produced by phase shifter Ph is adjustable by $\pm\Delta\phi$. Since, in this manner, the symmetry axis can be turned through corresponding angles to either the right or to the left, an adjustment of the antenna system relative to a given axis is made possible.

Figure 5:
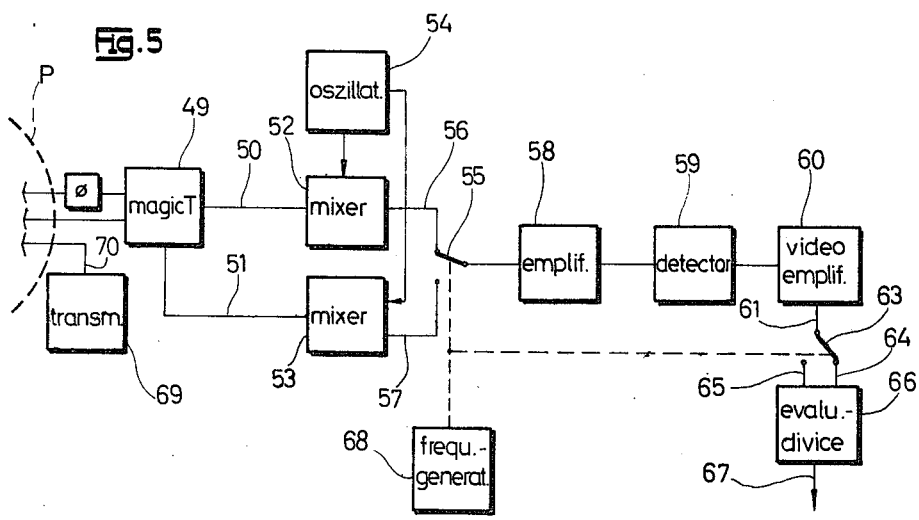
FIG. 5 is a block diagram of a radar installation utilizing an antenna energizing system embodying the invention for energizing an antenna for direction finding by amplitude comparison.

FIG. 5 illustrates the antenna excitation or energizing arrangement of the invention as incorporated in a radar installation. Since both directional characteristics, that on the E-arm and that on the H-arm, are available simultaneously through the magic T indicated at 49, the outputs 50 and 51 of magic T 49 are connected to respective mixer stages 52 and 53 in each of which conversion of the receiving frequencies to a lower intermediate frequency occurs in a manner known per se. To that end, a local oscillator 54 is connected with both mixer stages. Through a switch 55, outputs 56 and 57 of the respective mixer stages are alternately connected to the further receiver stages including intermediate frequency amplifier 58, a second detector 59 and a video amplifier 60. Thus, it is no longer necessary to switch the high frequencies of the X-band, or of a similar high frequency band, but only the low intermediate frequencies.

Through a switch 63, output 61 of video amplifier 60 is connected alternately with inputs 64 and 65 of an evaluation device 66 in which the signals, picked up by the antenna, are evaluated in a known manner not illustrated herein. Signal voltages analogous to the direction of an object picked up by the antenna are derived at an output 67 of evaluation device 66. Through the medium of a switching frequency generator 68, switches 55 and 63 are controlled synchronously.

As switches, known electronic switches having rectangular switching characteristics, such as the so-called switching diodes, are used. As a result of the high frequency switching between the two simultaneously present directional characteristics, the amplitude noise, hitherto present in devices for direction finding by amplitude comparison, is reduced to a minimum.

As further illustrated in FIG. 5, a transmitter 69 is connected by a separate channel 70 to feed the transmitting energy into the antenna system P. By virtue of this arrangement, the transmitting characteristic of the radar installation is not switched along with the receiving characteristic, so that a foe is not given any possibility of recognizing the switching frequency. Due to the supplying of the transmitting energy through the separate channel 70, there is further provided an effective decoupling of the transmitting and receiving channels, so that the hitherto required measures for the production of the receiver mixer diodes, or so-called TR switches, can be simplified.

Figure 6:
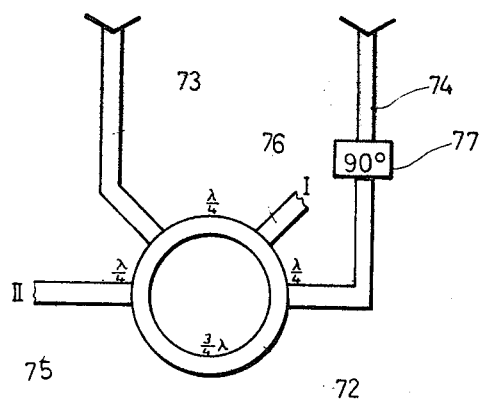
FIGS. 6 and 7 are schematic illustrations of other embodiments of antenna energizing arrangements in accordance with the invention.

Instead of using, as a hybrid junction, the magic T shown at 49 in FIG. 5, any other hybrid junction may be used provided it has the property of forming sums and differences in its branches. For example, and as shown in FIG. 6, a hybrid ring called rat race 72, acting as a differential transformer, may be used. This ring conductor 72 has inputs 73 and 74 and outputs 75 and 76. Analogously with the arrangement previously described, one of the two feeding antenna arms, such as the input 74, for example, may have a 90° phase shifter 77 connected therein.

Figure 7:
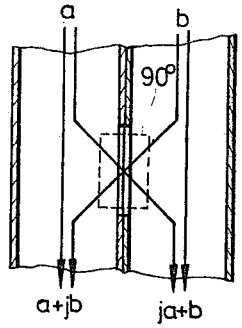

In the embodiment of the invention shown in FIG. 7, the hybrid junction is illustrated as a decoupled branching from two parallel rectangular hollow conductors coupled at the narrow side through a slot, or a so-called side wall, short slot coupler. In this coupler, as the waves pass through the window joining the two hollow conductors, a phase shift of $\phi=90°$ occurs automatically. In FIG. 7, the radiating or receiving hollow conductors are also denoted by $a$ and $b$ so that, when considering the case during receiving, at the occurrence of an electromagnetic wave at $a$ and $b$, the waves $a+jb$ and $ja+b$ are formed simultaneously at the ends of the hybrid junction facing away from the points $a$ and $b$. In this manner, there again results the antenna diagram shown in FIG. 4 having the two overlapping directional characteristics $e$ and $h$.

It will be readily understood that other hybrid junctions may be used, the important point being that, through an additional phase shift of 90° in one branch, the simultaneous production of two overlapping directional characteristics through a hybrid junction forming the sum and the difference is obtained.

What is claimed is:

1. In apparatus for radar direction finding by amplitude comparison of received signals of overlapping directional characteristic lobes and including an antenna having a symmetry axis, transmit-receive elements, each having a conduction branch, operatively associated with the antenna and arranged in side-by-side relation, and signal evaluation means, including lobe switching means, operatively connected to the elements: an improved antenna energizing arrangement comprising, in combination, a hybrid junction directly connected to and interconnecting two such mutually associated elements and forming the sum and difference of their radiating characteristic signals, said hybrid junction having two outputs connected to said lobe switching means; and phase shifting means providing, at the outputs of said hybrid junction and simultaneously, two overlapping directional characteristic lobes having their respective symmetry axes offset in respective opposite directions and in substantially the same plane relative to the symmetry axis of said antenna.

2. An improved antenna energizing arrangement, as claimed in claim 1, in which said phase shifting means comprises a phase shifter in said hybrid junction and producing a phase shift of substantially 90° between said two mutually associated elements so that, at one output of the hybrid junction, the phase shift in the conduction branch of one element and, in the other output of the hybrid junction, the phase shift in the conduction branch of the other element, are produced simultaneously.

3. An improved antenna energizing arrangement, as claimed in claim 1, in which said hybrid junction comprises a magic T.

4. An improved antenna energizing arrangement, as claimed in claim 1, in which said hybrid junction comprises a hybrid ring acting as a differential transformer.

5. An improved antenna energizing arrangement, as claimed in claim 1, in which said hybrid junction comprises a decoupled branching from two parallel rectangular hollow conductors coupled at narrow sides thereof through a slot in such narrow sides.

6. An improved antenna energizing arrangement, as claimed in claim 1, in which said phase shifting means comprises at least one phase shifter variable, relative to a 90° phase shift, in opposite directions by an angular amount $\pm \Delta \phi$ whereby a deflection of the symmetry axis of the overlapping directional characteristics of the antenna can be effected.

7. An improved antenna energizing arrangement, as claimed in claim 1, in which the means for switching the outputs of said hybrid junction are provided only on the receiving side of said apparatus for radar direction finding.

8. An improved antenna energizing arrangement, as claimed in claim 1, in which the means operatively connecting said signal evaluation means to said elements includes intermediate frequency amplifying and detecting means, and switching means connecting the output of said intermediate frequency amplifying and detecting means to said evaluation means; said lobe switching means being interposed between said hybrid junction and the input of said intermediate frequency amplifying and detecting means and operable to supply said two overlapping directional characteristics alternately to said intermediate frequency amplifying and detecting means.

9. An improved antenna energizing arrangement, as claimed in claim 8, in which the means operatively connecting said signal evaluation means to said elements further includes two mixer stages each connected to a respective output of said hybrid junction and each producing a respective intermediate frequency output at a frequency lower than that of the energy lower than that of the energy fed to said antenna; said lobe switching means being connected between the output of said mixer stages and the input of an intermediate frequency amplifier included in said intermediate frequency amplifying and detecting means and rhythmically switching the input of said intermediate frequency amplifier, at a very high being connected between the outputs of said mixer stages a detector connected to the output of said intermediate frequency amplifier; and a video amplifier connected to the output of said detector; said first-mentioned switching means being operated in synchronism with said lobe switching means and connecting the output of said video amplifier alternately with two respective inputs of said signal evaluation means.

10. An improved antenna energizing arrangement, as claimed in claim 9, in which each of said switching means comprises an electronic switching means.

11. An improved antenna energizing arrangement, as claimed in claim 10, in which said electronic switching means comprise switching diodes.

References Cited

UNITED STATES PATENTS

| 2,981,948 | 4/1961 | Kurtz. |
| 3,343,165 | 9/1967 | Sleeper. |
| 3,346,861 | 10/1967 | Chadwick et al. _____ 343—16 |

RODNEY D. BENNETT, JR., Primary Examiner

JEFFREY P. MORRIS, Assistant Examiner

U.S. Cl. X.R.

343—100.6